United States Patent [19]

Sokolov

[11] Patent Number: 5,942,858

[45] Date of Patent: *Aug. 24, 1999

[54] APPARATUS FOR SUPPLYING DIRECT CURRENT PULSES TO AN ELECTRICAL LOAD FOR IMPROVED EFFICIENCES

[75] Inventor: Vladimir Sokolov, Ljubljana, Slovenia

[73] Assignee: Nico-Elektro Aktiengesellschaft, Vaduz, Liechtenstein

[*] Notice: This patent issued on a continued prosecution application filed under 37 CFR 1.53(d), and is subject to the twenty year patent term provisions of 35 U.S.C. 154(a)(2).

[21] Appl. No.: 08/581,621

[22] PCT Filed: Jul. 19, 1994

[86] PCT No.: PCT/EP94/02375

§ 371 Date: Apr. 8, 1996

§ 102(e) Date: Apr. 8, 1996

[87] PCT Pub. No.: WO95/03681

PCT Pub. Date: Feb. 2, 1995

[30] Foreign Application Priority Data

Jul. 20, 1993 [DE] Germany ............... 43 24 331

[51] Int. Cl.[6] .................. H05B 39/00; H05B 39/04; H05B 39/09

[52] U.S. Cl. ................. 315/246; 315/72; 315/291; 340/384.7; 307/106

[58] Field of Search ............... 363/41; 315/72, 315/246, 209 R, 287, DIG. 5, DIG. 7, 291; 307/157, 106; 332/112; 340/384.7

[56] References Cited

U.S. PATENT DOCUMENTS

| 4,128,788 | 12/1978 | Lowther | 315/176 |
| 4,215,339 | 7/1980 | Durkee | 340/384.7 |
| 4,442,362 | 4/1984 | Rao | 307/108 |
| 4,964,028 | 10/1990 | Spataro | 363/56 |
| 5,130,608 | 7/1992 | Zahardis | 315/209 R |
| 5,216,695 | 6/1993 | Ross et al. | 375/59 |

FOREIGN PATENT DOCUMENTS

| 27 05 540 A1 | of 1978 | Germany . |
| 32 08 083 A1 | of 1983 | Germany . |
| 39 20 847 A1 | of 1991 | Germany . |
| 124762 | 2/1980 | Poland . |

*Primary Examiner*—Arnold Kinkead
*Attorney, Agent, or Firm*—Gregory S. Rosenblatt; Thomas F. Presson; Wiggin & Dana

[57] ABSTRACT

An apparatus supplies an ohmic, inductive or capacitive load with needle pulse trains in which each individual pulse has a duration of less than 1 millisecond. Due to pulse amplitudes which are by far higher in relation to the nominal voltage of the load, considerable increases in efficiency can be achieved, however, without damaging the load or impairing its useful life. The needle pulses are of constant amplitude and the same polarity. The ratio between pulse voltage and nominal voltage is always higher than 1.7.

70 Claims, 5 Drawing Sheets

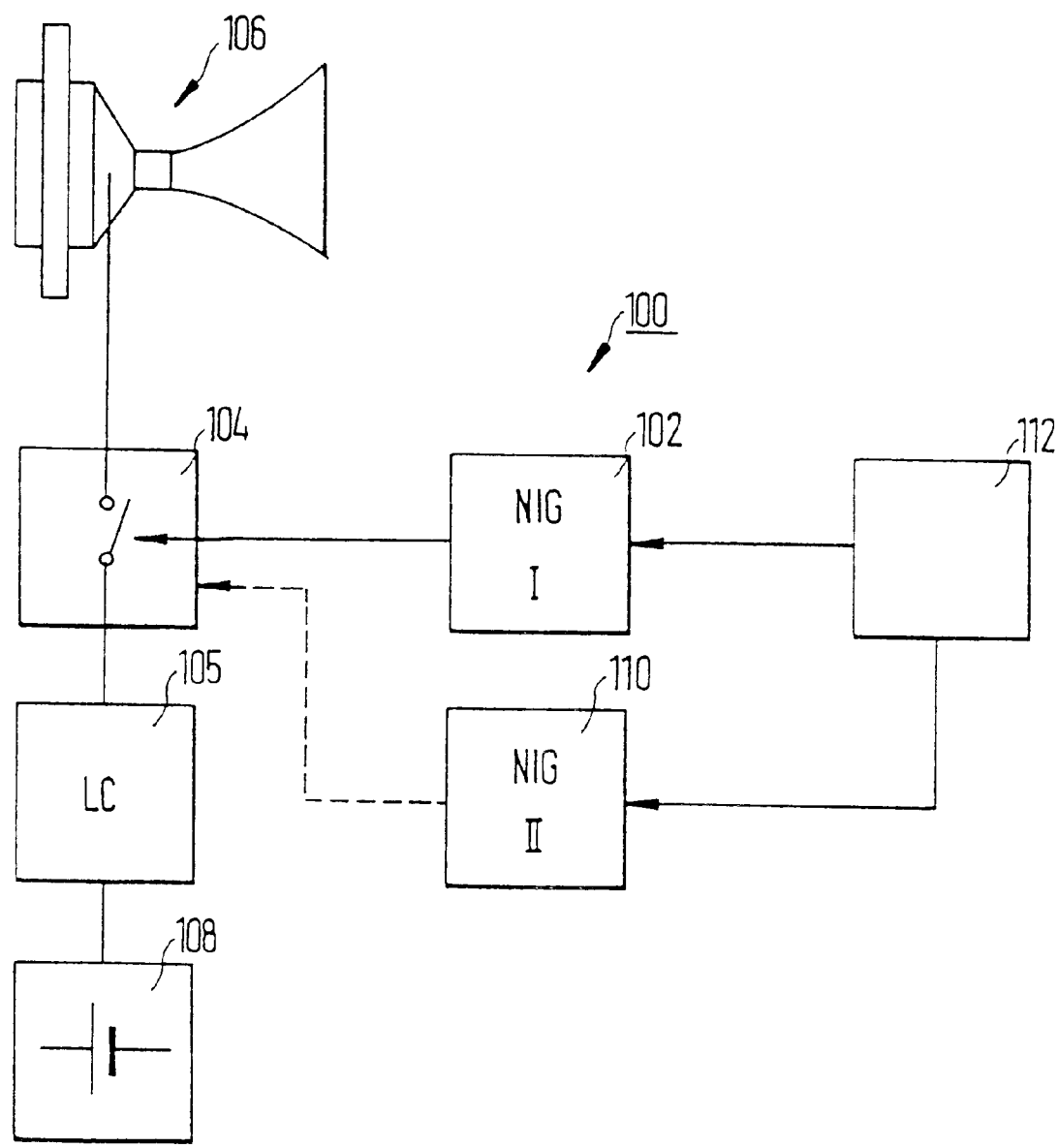

APPARATUS FOR SUPPLYING DIRECT CURRENT PULSES TO AN ELECTRICAL LOAD FOR IMPROVED EFFICIENCES

BACKGROUND OF THE INVENTION

1. Field of the Invention

The invention relates to an apparatus for feeding an electrical load having a predetermined nominal voltage, comprising an input for connection to a supply voltage source and an output for the load.

2. Description of Related Art

Such an apparatus, in its simplest form, consists of a mechanical switch for closing a circuit connecting a supply voltage source, e.g. a battery or the electric network, to the load. The load most typically is an incandescent bulb. The circuit may contain in addition a fuse against overload.

By way of specific measures in circuit technology, the load may be fed with more or less energy in order to control for example the brightness of an incandescent bulb from 0 per cent to 100 per cent. This is effected e.g. with the aid of a potentiometer. Commonly used at present are so-called phase-angle controls with thyristors or triacs connecting each half-wave of an alternating voltage to the load at a delayed, selectable moment of time.

Feeding of an electrical load with direct current and feeding of an electrical load with alternating current each involve advantages and disadvantages. Attempts have been made specifically with incandescent bulbs and other illumination devices to obtain an increased luminosity factor or light yield (with a given electrical power) by improving the efficiency.

For feeding electrical loads it is known in particular also with stepping motors or the like to apply a pulse-shaped supply voltage to the load, with the duty cycle of the pulse train, i.e. the ratio of pulse width to pulse spacing or interval, determining the power supplied to the load from 0 to 100 per cent. In the extreme case of such pulse-shaped feeding, pure direct current is fed to the load. The pulse width then is 100 per cent, whereas the interval is 0 per cent, corresponding to a duty cycle (pulse/interval) of infinity. The voltage amplitude of the voltage pulses must in each case correspond to the nominal voltage of the load.

SUMMARY OF THE INVENTION

The present invention aims at achieving a considerably higher efficiency in feeding an electrical load as compared to the prior art, in particular in the case of ohmic loads, e.g. incandescent bulbs, but also with purely or mainly inductive or capacitive loads, which are of poor efficiency, so as to obtain an enhanced exploitation of electrical energy.

According to the invention, this is achieved by a needle pulse shaper applying a train of needle pulses to the output connected to the load.

In the ideal case, these needle pulses are Dirac surges, i.e. pulses with an extremely high amplitude and an extremely short, but stable pulse duration.

The amplitude of the needle pulses fed to the load is limited by the presently available electronic circuit means for producing the pulses. With presently available electronic circuit means, pulse durations in the order of magnitude of 100 nanoseconds can be realized. Accordingly, very high voltages can be employed which are greater than the nominal voltage of the load by a factor in the range of one or two orders of magnitude.

With a direct current circuit, care must be taken that the supply voltage fed to the load is by no means substantially greater than the nominal voltage. However, it is known that there is an almost proportional relationship between the quotient of supply voltage and nominal voltage on the one hand and the efficiency of the consumer (=brightness of an incandescent bulb) and the useful life of the consumer on the other hand. For example, when a bulb with a nominal voltage of 100 volts is fed with a voltage of only 90 or even just 80 volts, the efficiency deteriorates, i.e. the light yield becomes clearly lower. However, with decreasing efficiency, the useful life increases at the same time. When the supply voltage is in the opposite manner increased to 110 or even 120 volts, the efficiency, i.e. in the present case the light yield, is improved, but the useful life deteriorates correspondingly. When the supply voltage is considerably higher than the nominal voltage, e.g. by a factor of 1.5, the load will be destroyed within a short period of time.

By the measure according to the invention, the useful life of the load is definitely not affected negatively, but rather is extended. Due to the fact that the needle pulses supplied to the load are of extremely short duration, the load is not destroyed, not even when the voltage of the pulses is by far higher than the nominal voltage of the load.

With the apparatus according to the invention, the duty cycle of the needle pulse is at the most about 0.3, which corresponds to a ratio of pulse duration to pulse spacing or interval of, for instance, 3 to 10.

It has turned out that when feeding for instance an incandescent bulb, the same light yield can be achieved when according to the invention, instead of the usual alternating voltage, needle pulses are supplied having a voltage amplitude that is by a multiple higher than the nominal voltage of the bulb, and the electrical power consumed is only a fraction of the power consumed earlier.

When looking at the spectrum of a Dirac surge, a multiplicity of harmonics can be seen. All components are consumed in the electrical load. Specifically with loads that are purely inductive or contain inductive components, a diode is connected antiparallel to the load. The effect achieved thereby is that possible reactive energy is returned to the load.

According to the invention, the needle pulses are of constant pulse width, but at the same time are extremely narrow with a relatively high voltage amplitude. They are always direct current pulses, i.e. pulses having the same polarity.

Regulation of the load control takes place in simple manner by corresponding elongation of the pulse intervals. At the highest possible power in the load, the duty cycle (pulse duration/pulse interval) is set to the greatest possible value of 0.3 in the present case. The corresponding ratio of supply voltage amplitude to nominal voltage then is approx. 1.7 (square root of 3). In case of voltage ratios (pulse amplitude/nominal voltage of the load) of lower value, no good effects are achieved any more, although the energy exploitation achieved is still better as compared with the prior art. The higher the ratio of pulse amplitude to the nominal voltage of the load, the better the effect obtained. To be preferred are voltage ratios of more than 1.7; in particular values of more than 3, and particularly preferred are values of more than 5. The nominal voltage of the load should not be less than the amplitude of the needle pulses divided by the square root of the pulse interval normalized to the pulse duration ($UZ_{nom} \geq UB/SQR(t_p/t_l)$).

For obtaining, with short pulses, high switching speeds, electronic switches must be employed. Thus, according to the invention an electronic rapid switch is provided between the input and the output of the apparatus. Possible therefore are for instance field effect transistors (FETs) or bipolar transistors. When using an FET as the rapid switch, control with an impressed voltage takes place. In case a bipolar transistor is used, a current control takes place in order to pay regard to the high-ohmic input resistance of the FET or the low-ohmic input resistance of the bipolar transistor, respectively, and to obtain high switching speeds.

The use of needle pulses with high voltage amplitude necessitates measures for avoiding a negative effect on the environment, and in particular on the supply voltage source. According to the invention, the input of the apparatus has an LC filter connected thereto. This low pass filter enables that energy is available for the needle pulses and ensures the stability of said pulses, but at the same time prevents a retroaction on the voltage source.

Flow back of energy from the load in the direction towards the supply voltage source is prevented in particular by a reverse flow blocking diode connected upstream of the apparatus output.

The voltage amplitude of the needle pulses fed to the load is related to the duty cycle of the needle pulse train. According to the invention, the value of the nominal voltage is related to voltage amplitude of the needle pulses by way of calculation of the square root of the duty cycle. With a duty cycle of $t_I: t_P$ of 1:10 and a given nominal voltage, the voltage amplitude of the needle pulses must not be higher than approx. three times the nominal voltage. Thus, with a predetermined level of the voltage pulses (battery voltage), the nominal voltage may be smaller than the battery voltage at the most by the factor corresponding to the square root of the duty cycle. This condition was made on the prerequisite that the load in fact receives a much higher power than the nominal power, but should receive the same energy as in conventional manner.

In a specific application of the above-outlined principle of load control, the invention provides that the load is an electronic horn or siren.

Electronic sirens are known. An electronic transducer (loudspeaker) is driven by means of a modulation stage via an amplifier final stage. The mode of operation of this known electronic siren is basically analog. When commonly required loudnesses are to be achieved (e.g. 115 dB at a distance of 32 m), considerable power must be fed to the transducer. It is necessary to adapt the chracteristic output impedance of the final stage of the amplifier to the impedance of the load. This causes considerable losses.

The electronic siren according to the invention comprises a needle pulse generator which, via an electronic switch of the final stage, connects the electroacoustic transducer to a voltage source, in particular a battery.

BRIEF DESCRIPTION OF THE DRAWINGS

Embodiments of the invention shall now be elucidated in more detail by way of the drawings in which

FIG. 9 shows a block diagram for feeding an electronic siren.

DETAILED DESCRIPTION

Figure 1:
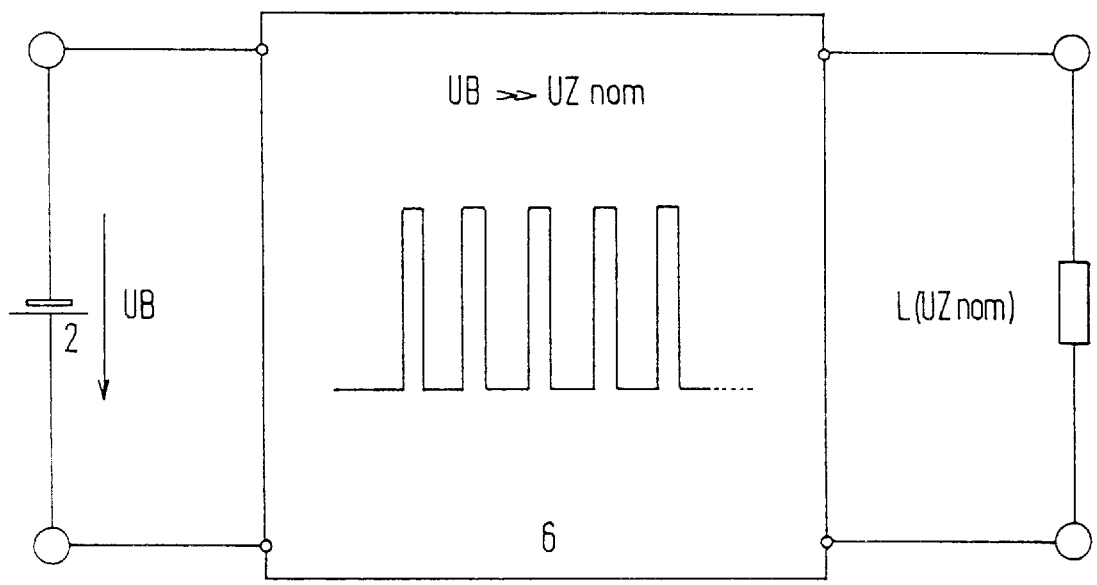
FIG. 1 shows a basic circuit diagram of an apparatus for feeding an electrical load.

According to FIG. 1, a voltage source 2 having a battery voltage UB has a load L with a nominal voltage $UZ_{nom}$ connected thereto via a switching means 6.

The voltage source 2 may be a battery or a conventional rectifier arrangement delivering a direct voltage UB from a mains alternating voltage of e.g. 220 V with the aid of a transformer, a rectifier and a smoothing capacitor.

The load L in the instant case specifically is an ohmic load, in particular an electric incandescent bulb. The embodiments described herein are also suitable for inductive and capacitive loads or complex loads (loads of a combination of ohmic, inductive and capacitive elements). However, the invention is used in particular with ohmic, inductive and capacitive loads with low efficiency, such as incandescent bulbs, electro-acoustic and piezoelectric transformers and the like.

As an example of the application in an electroacoustic transducer as load, an electronic siren will be described further below, which constitutes a good example of the excellent energy exploitation.

As indicated in FIG. 1, the battery voltage UB according to the invention is by far greater than the nominal voltage $UZ_{nom}$ of the load L.

In the switching means 6, a train of needle pulses (similar to the Dirac pulses) is produced from the battery voltage UB by means of circuit technology measures described in more detail below, with the voltage amplitude of the individual pulses corresponding to the battery voltage UB and the duty cycle (pulse duration/pulse interval) being adjustable and being not greater than 0.3.

Figure 3:
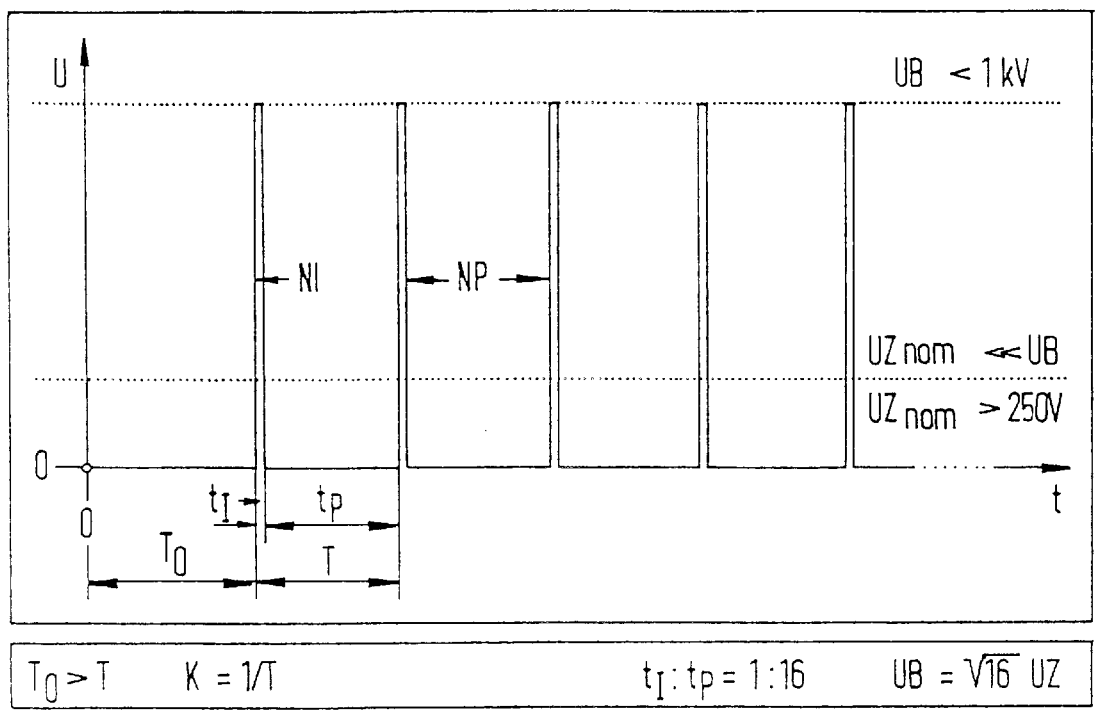
FIG. 3 shows a train of needle pulses.

As shown in FIG. 3, the needle pulses depicted there have a peak amplitude corresponding to the battery voltage UB which is greater than the load nominal voltage $UZ_{nom}$ by approx. the factor 4. In the embodiment shown, the ratio of the pulse duration $t_I$ to the pulse interval $t_p$ is approx. 1:16. The "period duration" of the individual pulses is T, except for the first period, To, for which the inequality To>T holds. This is caused by circuit technology.

Figure 2:
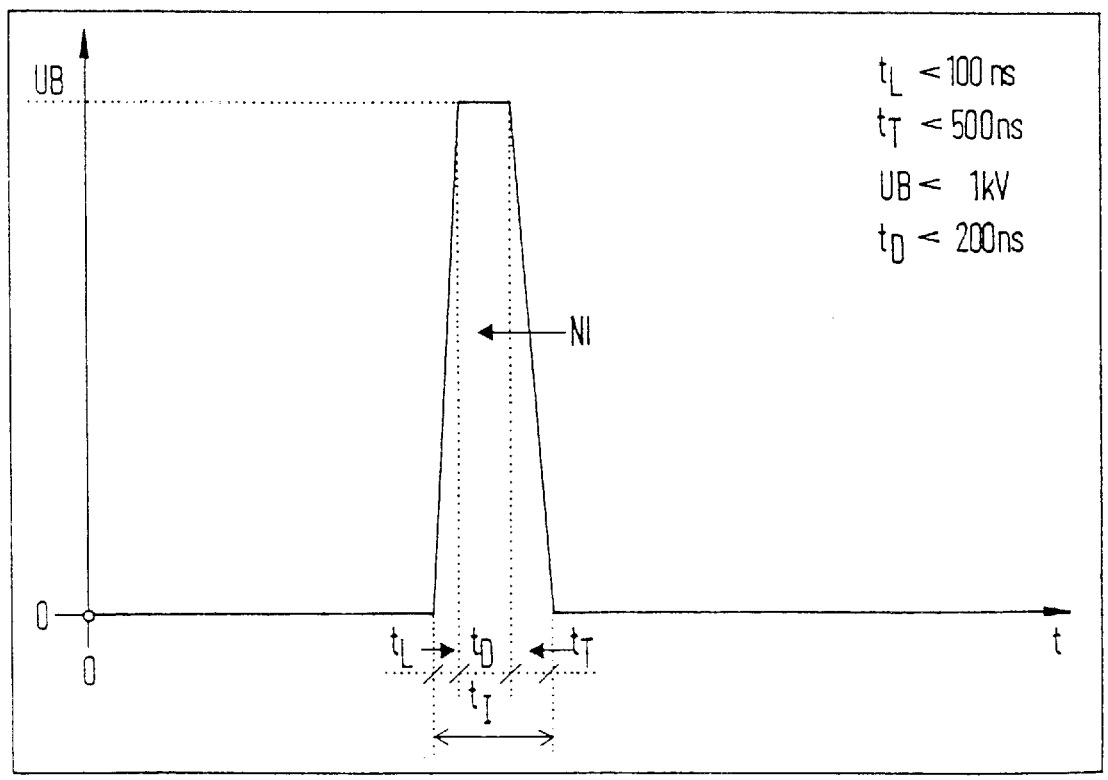
FIG. 2 shows a pulse diagram of a real needle pulse similar to the ideal Dirac needle pulse.

FIG. 2 shows an individual stable needle pulse in an enlarged view. This needle pulse constitutes an approximation to the (ideal) Dirac pulse. The overall pulse duration proper is $t_I$. This pulse duration $t_I$ comprises a rise time $t_L$ of less than 100 nanoseconds, a "holding time" $t_D$ of about 100 (at the most 200) nanoseconds and a decay time $t_T$ of less than 500 nanoseconds. The needle pulses have an overall duration ($t_I$) of at most 1000 nanoseconds and preferably at most 700 nanoseconds. The battery voltage UB is between 10 and 1000 V.

Figure 4:
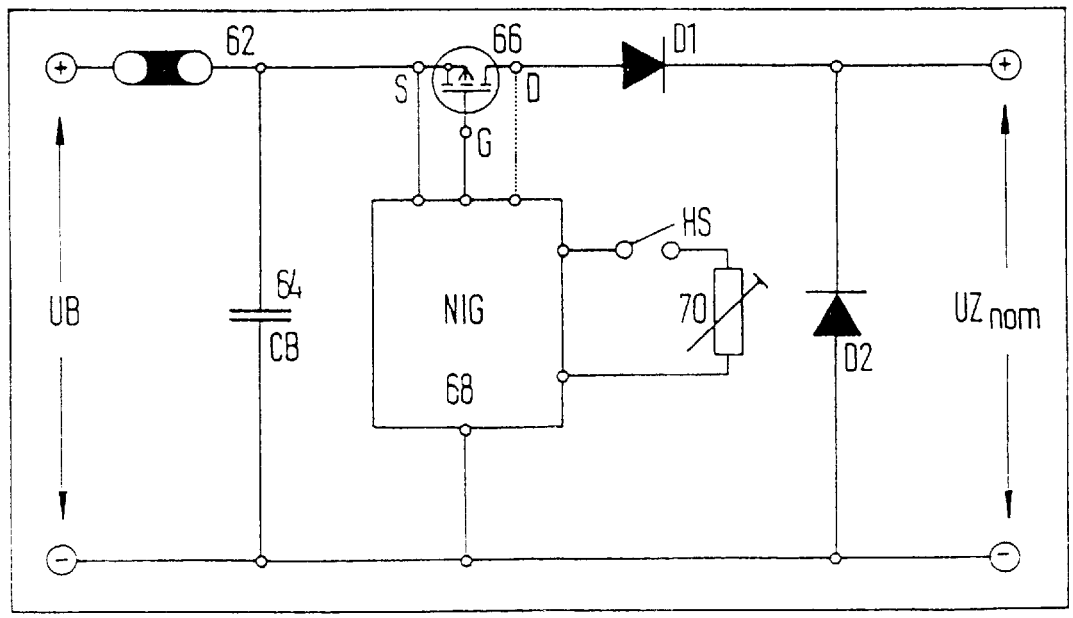
FIG. 4 shows a basic circuit diagram of the apparatus for feeding an electrical load, which is depicted only schematically in FIG. 1.

FIG. 4 is a detailed representation of the switching means 6 depicted only schematically in FIG. 1. Shown to the left is the input of the switching means, which receives the battery voltage UB, and shown to the right in FIG. 4 is the output to which the load L is connected, having a nominal voltage $UZ_{nom}$. At the input of the switching means there is provided an LC filter consisting of a coil 62 and a capacitor 64.

An electronic switch 66, designed as self-blocking FET in the present example, is controlled at its gate terminal G by a needle pulse generator NIG 68 with impressed voltage. Through the switch 66 signalizes an ON or OFF state to the needle pulse generator. At the output, a diode D2 is provided antiparallel to the load. Between the output and the electronic switch 66 there is located a reverse flow blocking diode D1.

The needle pulse generator 68 has a potentiometer 70 connected thereto, arranged in series with a main switch HS, by means of which the spacing or interval duration is adjustable from a minimum to an infinite interval value. The infinite interval is adjusted by opening of the main switch, which corresponds to switching off of the needle pulse generator 68. Further adjusting members, omitted here for the sake of simplification, permit in addition an adjustment of the pulse duration, blocking and unblocking of the needle pulse generator, the external synchronization and modulation of the pulse and, separately therefrom, of the pulse interval.

The operating current of the needle pulse generator 68 flows via the connection between the source terminal S of the FET switch 66 and the needle pulse generator 68 and the connection between the needle pulse generator 68 and the common lower busbar of the apparatus according to FIG. 4.

Figure 5:
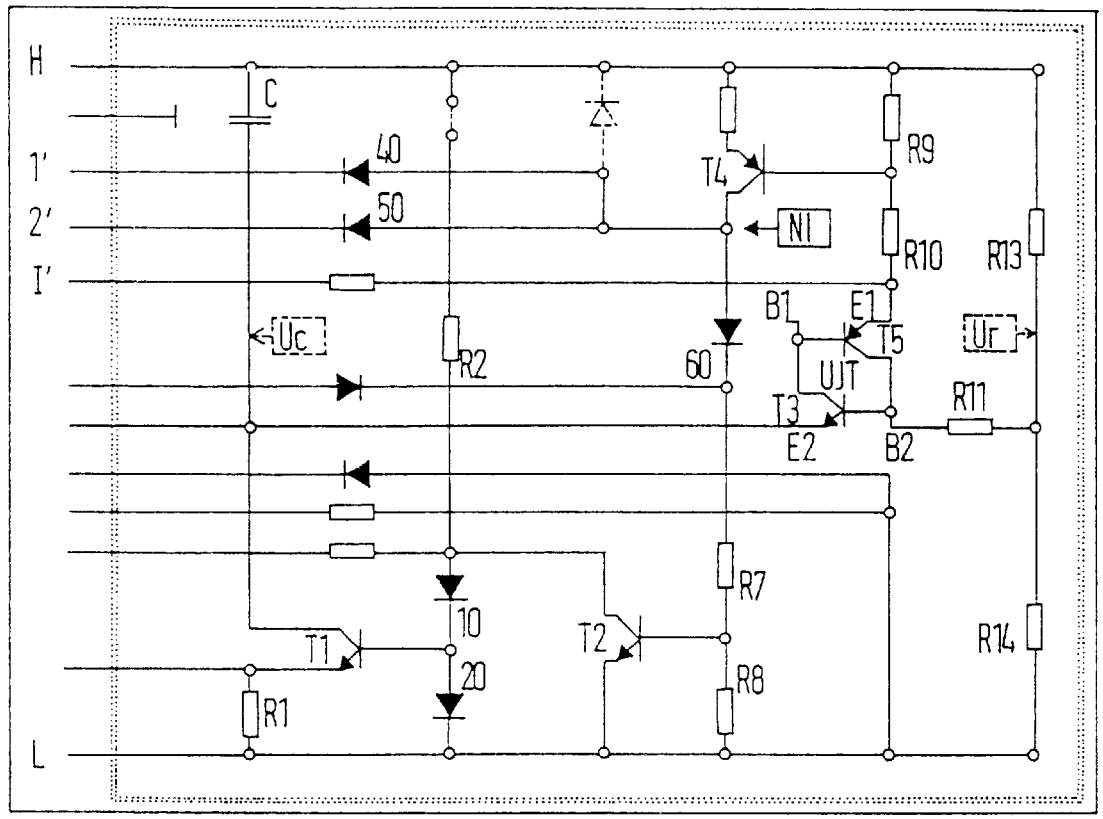
FIG. 5 shows a detailed circuit sketch of the generator for real needle pulses (NIG) shown as a block in FIG. 4.

FIG. 5 is a detailed view of the needle pulse generator 68 according to FIG. 4, which in practical application is designed as a one-piece module of small dimensions (10× 20×30 mm). It is designed for battery voltages UB between 5 and 100 V. Somewhat larger modules for battery voltages UB between 10 and 1000 V and up to 20 W are possible with presently available components. The future development of the electronic components will render possible needle pulse amplitudes of voltages in the range of many thousands of volts.

The greatest preset duty cycle in the present example is 1:9. A hermetic enclosure, not shown here in more detail, ensures a stable temperature operating range between minus 20 and plus 60° C.

Between the two terminals H and L, there is provided a series connection of a resistor R2 and two diodes 10 and 20. Upon application of a voltage, the then increased potential at the base of the transistor T1 opens this transistor T1. The transistor T1 operates as a constant current source and, depending on the dimensioning of a resistor R1 located at the emitter of T1, supplies a constant current to the resistor R2 and the diode 20, charging the capacitor C shown at the upper left in FIG. 5.

To the right in FIG. 5, a current flows at the same time across the voltage divider resistors R13 and R14, so that a reference voltage Ur is adjusted between said these resistors. When capacitor C is completely charged, the capacitor voltage Uc is about 1.05 times the reference voltage Ur. This is provided for by a unijunction transistor UJT formed of two individual transistors T3 and T5, with the base of T3 being connected to the collector of T5 and the base of T5 being connected to the collector of T3. As long as the potential at the emitter E2 of transistor T3 is higher than the reference voltage Ur, the UJT blocks a current flow across resistors R9 and R10.

As soon as the capacitor voltage has a value that is approx. 5 per cent greater than the reference voltage Ur, the leading edge of a needle pulse ($t_L$ in FIG. 2) begins to rise. By firing UJT, current flows across resistors R9 and R10, with the transistor T4 opening suddenly, due to the rapid decrease of its base potential as compared to its emitter. A needle pulse NI (similar to a Dirac needle pulse) is issued via diodes 40 and 50. A current then also flows through diode 60 and resistors R7 and R8. The potential increase at the base of T2 opens this transistor T2, whereby transistor T1 blocks instantaneously. Charging of capacitor C is interrupted thereby. The energy stored in capacitor C is passed via transistor T4 and diodes 40 and 50 to outputs 1' and 2'. The time duration $t_D$ in FIG. 2 is defined in the circuit according to FIG. 5 by the path of discharge of the capacitor, which is constituted by UJT, R10 and the parallel connection of resistor R9 and the base to emitter path of transistor T4 inclusive of resistor R6.

The opening time of UJT lasts until capacitor C is almost completely discharged. This capacitor C was completely empty only before firing of the first needle pulse, which is the reason why the first time period To is relatively long. Closure of UJT takes place in the period $t_T$ in FIG. 2.

Figure 6:
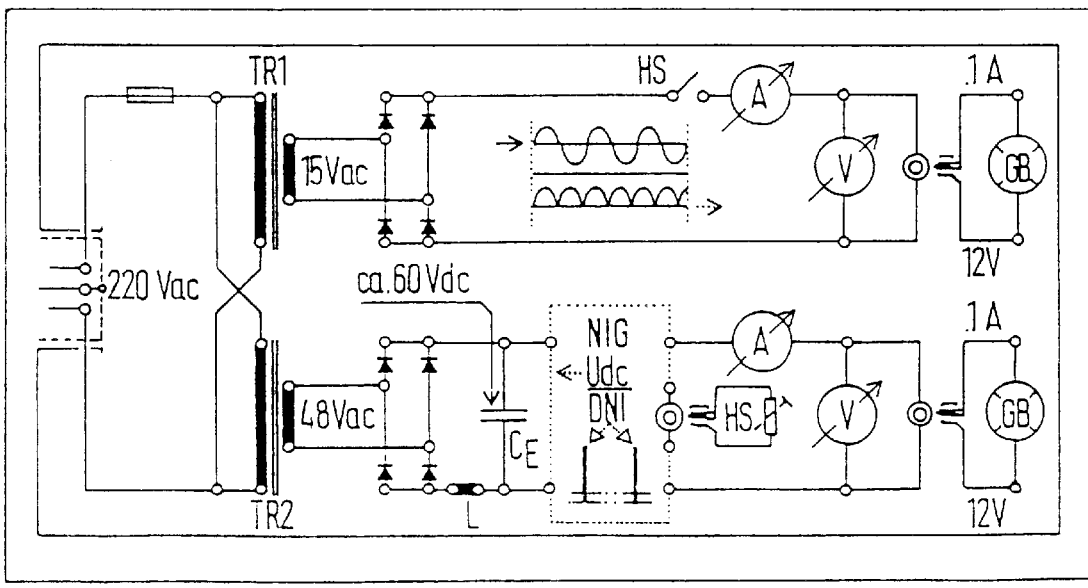
FIG. 6 shows a circuit arrangement for feeding an incandescent bulb from an alternating voltage source with the aid of a rectifier (conventional) and a needle pulse generator NIG (according to the invention), respectively.

FIG. 6 shows a circuit arrangement illustrating a conventional apparatus for feeding an incandescent bulb as load on the one hand and an apparatus according to the invention on the other hand.

A 220 V alternating voltage network has two transformers TR1 and TR2 connected thereto. On the secondary side of TR1 a 15 V alternating voltage is rectified by a full-wave rectifier and fed to an output jack terminal for a 12 V incandescent bulb GB. At the output there are provided a current meter and a voltmeter. This consumer circuit can be controlled by means of the mechanical main switch HS.

The secondary coil of TR2 delivers an alternating voltage of 48 V to a full-wave rectifier. A battery voltage of approx. 60 V direct voltage is thus available at capacitor CE.

The needle pulse generator produces therefrom a needle pulse train in the manner described hereinbefore in conjunction with FIG. 5. The needle pulses are fed to the output to which the 12 V bulb is connected as load. A jack plug HS has a potentiometer installed therein so that this device serves as a control member of the needle pulse intervals and thus renders possible full control of the respective circuit in the easiest way.

A circuit arrangement designed according to FIG. 6 has revealed in operation that the feeding apparatus in the lower part, i.e. the feeding apparatus designed according to the present invention, provided the same brightness of the bulb GB with only half of the average power consumption.

Further tests with inductive loads have revealed similar energy savings effects, for example, an electroacoustic transformer with a pressure chamber (a powerful loudspeaker) was fed as inductive load by means of the apparatus according to the invention. Here too, considerable energy savings as compared to conventional arrangements were achieved.

The demonstration arrangement according to FIG. 6 permits a comparison between the conventional and the inventive type of feeding of an ohmic load of poor efficiency (incandescent bulb) on a comparative basis.

Figure 7:
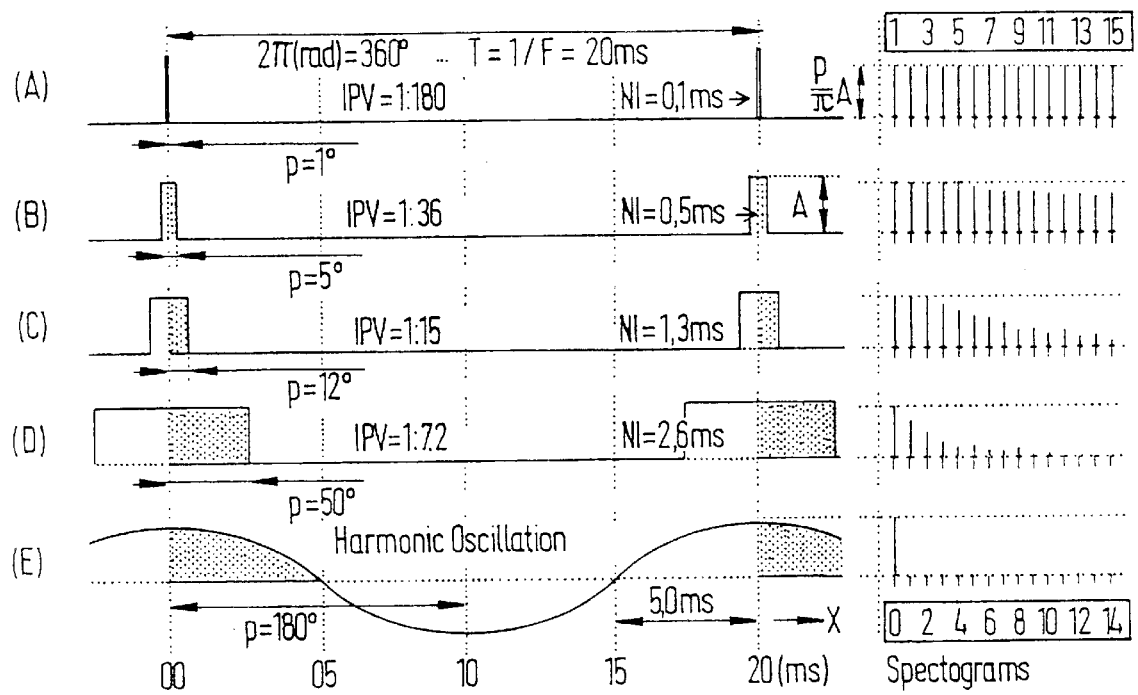
FIG. 7 shows a comparative representation of the signal shapes and spectrograms of an ideal harmonic oscillation and four different pulses, of which the pulses shown in the two uppermost rows (FIGS. 7(A) and 7(B)) correspond to the preferred needle pulses (Ni), and the pulses according to FIG. 7(C) and FIG. 7(D) are still usable as needle pulses as well, FIG. 8 show a schematic view of typical energy flows from the energy source via the load, illustrated by the fundamentally different efficiency of each of the three loads.

The left part of FIG. 7 shows functions of an ideal harmonic oscillation HS and of four pulse trains with widely different pulse/pulse interval ratios between 1:7.2 to 1:180. The period T of all oscillation functions is deliberately tuned to a duration of 20 milliseconds, which is exactly the repetition frequency of 50 Hz in case of the HS function located in the lower left part in the drawing. All five oscillation functions have (deliberately) an identical amplitude A.

The beginning and the end of the period duration T start at the peak of the positive half-wave of the harmonic oscillation, to the lower left in FIG. 7(E), or exactly in the middle of the pulses in the four pulse trains so as to be able to depict the Fourier series for respective oscillation functions more easily. The period T is also illustrated as one full circle revolution, i.e. $2\pi$ (rad) or 360°.

The time duration of the respective pulses is indicated both by their half "opening angle" p and by their half time duration.

In accordance with the Fourier analysis, all oscillation functions can be described by way of appropriate Fourier series so that they represent a specific calculable and measurable number of pure harmonic oscillations of defined frequencies and associated amplitudes as an equivalent. When putting the harmonic functions together, one obtains the basic function.

The voltages of the respective five oscillation functions to the left in FIG. 7 have the spectrums indicated to the right in FIG. 7. It is to be noted that the spectrum amplitudes of the harmonic components for the four pulse trains are not drawn to scale (the drawing shows the spectral lines for the needle pulse trains in exaggerated manner).

As can be seen, the amplitude A of the harmonic oscillation in the spectrum according to FIG. 7(E) corresponds exactly to the amplitude in the range of time given.

However, the spectrums of the pulse trains yield a quantity of several harmonic components. This quantity is the greater the narrower the pulses are.

According to the invention, needle pulses with a duty cycle of 1:3 are used, which are as narrow as possible, approx. like the needle pulses according to FIG. 7(A), FIG. 7(B) and FIG. 7(C), but still according to FIG. 7(D) as well.

The pulses according to FIG. 7(D) each have a spectrum in which the individual spectral lines are very nonuniform. The amplitudes may be dimensioned very differently, contrary to the schematic illustration of FIG. 7.

The two spectrums shown at the top in FIG. 7 constitute a particularly advantageous spectrum for the purposes according to the invention. The virtually ideal spectrum is realized by the pulse train shown in FIG. 7(A), which, with respect to the order of magnitude, can be realized in practical application with currently available circuit means. The individual components of the spectrum are virtually all of the same size and each have a very low amplitude value, which is considerably smaller than illustrated in FIG. 7(A).

The spectrum shown to the right in FIG. 7(A) is particularly advantageous since, due to the small amplitudes and the short time duration of these individual signal components, good stability of the circuit fed with this signal is achieved.

When a needle pulse generator is used for the apparatus according to the invention, which produces the needle pulses shown in FIG. 7(A) with a duty cycle of 1:180, a very large number of harmonic components is obtained, with the amplitudes thereof each being relatively small and resulting from the opening angle p=1°=0.028 rad. The mutually alike amplitudes in the present example can each be calculated as being somewhat less than 1 per cent of the pulse amplitude.

The above considerations hold for the range of validity of Ohm's law. The validity of Ohm's law definitely exists when the period duration T (cf. FIG. 3) is greater than 100 nanoseconds. Shorter period durations can hardly be realized at present and in the foreseeable future because of the non-existing electronic components.

The preceding considerations thus show that the utilization of very narrow needle pulses for feeding an ohmic, inductive, capacitive or complex load according to the invention always yields a high stability of the operation of the circuit. It is known that, when connecting a load to a voltage source, in particular an alternating voltage source, transients may occur, requiring complex measures in terms of circuit technology for avoiding them. Such problems are excluded from the very beginning by using needle pulses according to the invention.

Figure 8:
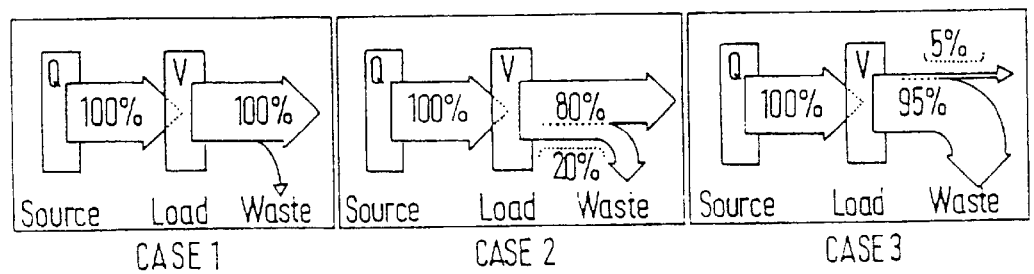

FIG. 8 schematically shows three cases of energy flow. Loss-free energy flow does not exist in practical application.

The case depicted to the left in FIG. 8 is ideal. 100 per cent energy flow from a source Q to a consumer V where the entire energy is converted to work, i.e. no "waste energy" whatsoever is created.

Case 2 shown in the middle of FIG. 8 illustrates the situation occurring frequently in practical application, in which the major part of the energy (80 per cent here) is converted in the consumer into useful work and only 20 per cent are lost.

To the right in FIG. 8, case 3 is shown in which only 5 per cent of the energy supplied are converted to useful work, while the remainder constitutes waste energy. This case corresponds quite exactly to an incandescent bulb in which approx. 5 per cent of the electrical energy supplied are converted into light, whereas the remaining 95 per cent are converted into (mostly undesired) heat. The measure according to the invention provides an improvement of the characteristic situation outlined by case 3 towards case 2.

The above considerations apply mainly to ohmic loads. However, the invention is equally applicable for inductive, capacitive or also complex loads. Although one cannot speak of active energy with such loads, considerations of the apparent energy flow (in case of an inductive or capacitive load) show that the apparatus according to the invention does not only achieve an improved efficiency, but also an enhanced stability.

The apparatus illustrated in FIG. 1 and FIG. 4 provides furthermore specific advantages which are not achieved in the presently used switching devices:

a) Upon turning on of the load, a voltage of 0 Volt is present at the circuit, depending on the respective circuit arrangement chosen.
 b) It is possible to perform an infinitely variable regulation from 0 to a maximum value, without requiring specific measures in terms of circuit technology therefor. The pulse generators used for producing the needle pulses (NI) are of such construction that they permit an alteration of the pulse intervals without specific expenditure.

FIG. 9 shows the structure of an electronic siren 100 by way of a block diagram. An electroacoustic transducer 106 provided with an exponential horn is connected to the final stage 104 of an amplifier circuit that is of no closer interest here. The schematically shown switch of final stage 104, which in reality is provided in the form of a semiconductor component, is controlled by a needle pulse generator (NIG I) 102, with the frequency of the Dirac needle pulses from NIG 102 being 420 Hz (to be exact: the first harmonic oscillation), which corresponds to the nominal frequency of the siren. The switch in final stage 104 connects the electroacoustic transducer 106 to a battery 108 via an LC filter 105 (coil and capacitor). The NIG 102 is controlled by a control means 112 which may be a program control that is known per se and commonly used in electronic sirens. In practical application, the final stage 104 may consist in essence only of the afore-mentioned switch.

Contrary to the known electronic sirens, the mode of operation of the siren according to FIG. 9 is of purely digital nature.

An essential advantage of the siren shown in FIG. 9 is the fact that virtually no quiescent current flows. When no needle pulse is applied to the final stage, the switch constituted by the final stage is virtually open. The internal resistance of the final stage output is virtually zero, allowing operation virtually without losses.

Due to the nature of the needle pulses employed here, numerous harmonic oscillations are present here in addition to the working frequency of 420 Hz, which in total provides a full siren sound.

The siren according to FIG. 9 renders possible the exploitation of the known per se "masking effect" in particularly advantageous manner. This effect is achieved by generation of two frequencies which are closely adjacent, but are definitely different from each other and not correlated by an integral factor, with FIG. 9 providing an additional NIG II 110 to this end. The frequency of said NIG II is slightly detuned with respect to that of NIG I. By way of such a control mode, a siren sound is created which—for psychoacoustic reasons—is felt by the listener to be much louder than a sound produced by two identical sound sources of equal strength. As an alternative, it is possible to provide for said NIG II a separate, further final stage and to connect the electroacoustic transducer to the two final stages. It is pointed out furthermore that a plurality of electroacoustic transducers may be connected in parallel, in series or in mixed form to the final stage 104 or said final stage pair.

In a practical embodiment that is not shown in the drawings, a plurality of sirens of the type shown in FIG. 9 are arranged in a siren tower, with the exponential horns of each electroacoustic transducer being disposed at different heights and with different radiation angles with respect to a vertical axis of this tower.

The NIG I 102 and the NIG II 110 are designed like the NIG 68 described hereinbefore (FIG. 5).

Practical tests show that an electronic siren 100 according to the invention can produce the acoustic power of a conventional electronic siren with only about one third of the electric power. It can thus be built with electronic parts of lower price.

Due to the fact that, when siren 100 is not switched on, virtually no quiescent current flows in NIG I 102, in NIG II 110 and in final stage 104, almost no current is consumed in this state. Nevertheless, upon switching on the siren 100, there is a "warm start" of the electronic components.

If desired, the siren 100 according to the invention may be operated at very high supply voltages, e.g. up to 400 V.

It is possible by means of the apparatus according to the invention to produce a rotating field for operating alternating current electric motors, with considerable energy savings and simplifications in synchronization being achieved as compared to the conventional motor controls.

I claim:

1. An apparatus for feeding an electrical load (L) having a predetermined nominal voltage ($UZ_{nom}$), comprising:
   an input for connection to a supply voltage source that supplies a needle pulse shaper;
   an output for connection to the load (L);
   said needle pulse shaper (6, 68) providing a train of needle pulses (NI) having a voltage amplitude (UB) from said supply voltage source and applying said train of needle pulses to the output connected to the load wherein the voltage amplitude (UB) of the needle pulses (NI) is greater than the nominal voltage ($UZ_{nom}$) at least by the factor of 1.7, but at most by the factor square root of the duration of a pulse interval divided by a pulse duration ($UB \leq UZ_{nom} \cdot SQR\ (t_p/t_I)$);
   wherein the duty cycle ($t_I/t_p$), is approximately less then 0.3, $t_I$ being the pulse duration and $t_p$ being the pulse interval.

2. An apparatus for feeding an electrical load (L) having a predetermined nominal voltage ($UZ_{nom}$), comprising:
   an input for connection to a supply voltage source;
   an output for connection to the load (L); and
   a needle pulse shaper (6, 68) applying a train of needle pulses (NI) having a voltage amplitude (UB) to the output connected to the load, wherein the needle pulse shaper (6, 68) is composed of an electronic circuit comprising:
   (a) a capacitor (C) adapted to be charged by a constant current source (T1);
   (b) a voltage divider formed with two resistors (R13, R14) and serving to produce a reference voltage ($U_r$);
   (c) a unijunction transistor (UJT) connected to the reference voltage ($U_r$) and to the capacitor voltage ($U_c$) and firing as soon as the capacitor voltage ($U_c$) becomes slightly greater than the reference voltage ($U_r$);
   (d) and a final transistor (T4) which is connected to the unijunction transistor (UJT) and to the capacitor (C) and, by firing of said unijunction transistor (UJT), is switched into the conductive state for the duration of one needle pulse (NI).

3. The apparatus according to claim 2, wherein the voltage amplitude (UB) of the needle pulses (NI) is greater than the nominal voltage ($UZ_{nom}$) at least by a factor of 1.7.

4. The apparatus of claim 2, wherein the voltage amplitude (UB) of the needle pulses (NI) is greater than the nominal voltage ($UZ_{nom}$) at the most by the factor square root of the duration of the pulse interval divided by the pulse duration ($UB \leq UZ_{nom} \cdot SQR\ (t_p/t_I)$).

5. An apparatus for feeding an electrical load (L) having a predetermined nominal voltage ($UZ_{nom}$), comprising:
   an input for connection to a supply voltage source;
   an output for connection to the load (L);
   a needle pulse shaper (6, 68) applying a train of needle pulses (NI) to the output connected to the load wherein the voltage amplitude (UB) of the needle pulses (NI) is greater than the nominal voltage ($UZ_{nom}$) at least by the factor of 1.7, but at most by the factor square root of the duration of a pulse interval divided by a pulse duration ($UB \leq UZ_{nom} \cdot SQR\ (t_p/t_I)$);
wherein the needle pulses (NI) each are of constant pulse width ($t_I$) and only the interval ($t_p$) between two adjacent needle pulses (NI) is variable.

6. The apparatus of claim 1, wherein the duty cycle ($t_I/t_p$) is from slightly above 0 to 0.3, wherein $t_I$ has a constant pulse duration and $t_p$ has a variable pulse interval.

7. The apparatus of claim 1, wherein the needle pulses (NI) are constant current pulses, i.e. pulses of the same polarity.

8. The apparatus of claim 1, wherein a diode (D2) is connected antiparallel to the load (L).

9. The apparatus of claim 1, wherein the apparatus comprises an electronic rapid switch (66).

10. The apparatus of claim 9, wherein the input has an LC filter (62, 64) connected thereto.

11. The apparatus of claim 1, wherein the output has a reverse flow blocking diode (D1) connected upstream thereof.

12. The apparatus of claim 2, wherein the load is selected from the group consisting of ohmic, inductive and capacitive.

13. The apparatus of claim 1, wherein the load is an incandescent bulb.

14. The apparatus of claim 1, wherein the needle pulses (NI) have a rise time of less than 100 ns.

15. The apparatus of claim 1, wherein the needle pulses (NI) have a holding time ($t_D$) of less than 200 ns.

16. The apparatus of claim 1, wherein the needle pulses (NI) have a holding time ($t_D$) of less than 100 ns.

17. The apparatus of claim 1, wherein the needle pulses (NI) have a decay time of less than 500 ns.

18. The apparatus of claim 1, wherein the smallest period duration (T) of the needle pulses is approximately 100 ns.

19. The apparatus of claim 1, wherein the load is an electronic siren (100).

20. The apparatus of claim 19, wherein a needle pulse generator (102) controls an amplifier final stage (104) connecting a current source (108) to an electro-acoustic transducer (106) of the siren (100).

21. The apparatus of claim 5, wherein the duty cycle ($t_I/t_p$) is approximately less than 0.3, wherein $t_I$ is the pulse duration and $t_p$ is the pulse interval.

22. The apparatus of claim 5, wherein the needle pulses (NI) are constant current pulses, i.e. pulses of the same polarity.

23. The apparatus of claim 5, wherein a diode (D2) is connected antiparallel to the load (L).

24. The apparatus of claim 5, wherein the apparatus comprises an electronic rapid switch (66).

25. The apparatus of claim 24, wherein the input has an LC filter (62, 64) connected thereto.

26. The apparatus of claim 5, wherein the output has a reverse flow blocking diode (D1) connected upstream thereof.

27. The apparatus of claim 5, wherein the load is selected from the group consisting of ohmic, inductive and capacitive.

28. The apparatus of claim 5, wherein the load is an incandescent bulb.

29. The apparatus of claim 5, wherein the needle pulses (NI) have a rise time of less than 100 ns.

30. The apparatus of claim 5, wherein the needle pulses (NI) have a holding time ($t_D$) of less than 200 ns.

31. The apparatus of claim 5, wherein the needle pulses (NI) have a holding time ($t_D$) of less than 100 ns.

32. The apparatus of claim 5, wherein the needle pulses (NI) have a decay time of less than 500 ns.

33. The apparatus of claim 5, wherein the smallest period duration (T) of the needle pulses is approximately 100 ns.

34. The apparatus of claim 5, wherein the load is an electronic siren (100).

35. The apparatus of claim 34, wherein a needle pulse generator (102) controls an amplifier final stage (104) connecting a current source (108) to an electro-acoustic transducer (106) of the siren (100).

36. The apparatus as claimed in claim 1, wherein the duty cycle ($t_I/t_p$), is approximately less than 0.1 wherein $t_I$ is the pulse duration and $t_p$ is the pulse interval.

37. The apparatus as claimed in claim 1, wherein the duty cycle ($t_I/t_p$), is approximately less than 0.01 wherein $t_I$ is the pulse duration and $t_p$ is the pulse interval.

38. The apparatus as claimed in claim 1, wherein the duty cycle ($t_I/t_p$), is approximately less than 0.006 wherein $t_I$ is the pulse duration and $t_p$ is the pulse interval.

39. The apparatus as claimed in claim 1, wherein the duty cycle ($t_I/t_p$), is approximately less than $10^{-4}$ wherein $t_I$ is the pulse duration and $t_p$ is the pulse interval.

40. The apparatus as claimed in claim 5, wherein the duty cycle ($t_I/t_p$), is approximately less than 0.1 wherein $t_I$ is the pulse duration and $t_p$ is the pulse interval.

41. The apparatus as claimed in claim 5, wherein the duty cycle ($t_I/t_p$), is approximately less than 0.01 wherein $t_I$ is the pulse duration and $t_p$ is the pulse interval.

42. The apparatus as claimed in claim 5, wherein the duty cycle ($t_I/t_p$), is approximately less than 0.006 wherein $t_I$ is the pulse duration and $t_p$ is the pulse interval.

43. The apparatus as claimed in claim 5, wherein the duty cycle ($t_I/t_p$), is approximately less than $10^{-4}$ wherein $t_I$ is the pulse duration and $t_p$ is the pulse interval.

44. The apparatus as claimed in claim 2, wherein the duty cycle ($t_I/t_p$), is approximately less than 0.3 wherein $t_I$ is the pulse duration and $t_p$ is the pulse interval.

45. The apparatus as claimed in claim 2, wherein the duty cycle ($t_I/t_p$), is approximately less than 0.1 wherein $t_I$ is the pulse duration and $t_p$ is the pulse interval.

46. The apparatus as claimed in claim 2, wherein the duty cycle ($t_I/t_p$), is approximately less than 0.01 wherein $t_I$ is the pulse duration and $t_p$ is the pulse interval.

47. The apparatus as claimed in claim 2, wherein the duty cycle ($t_I/t_p$), is approximately less than 0.006 wherein $t_I$ is the pulse duration and $t_p$ is the pulse interval.

48. The apparatus as claimed in claim 2, wherein the duty cycle ($t_I/t_p$), is approximately, less than $10^{-4}$ wherein $t_I$ is the pulse duration and $t_p$ is the pulse interval.

49. The apparatus of claim 2, wherein the needle pulses (NI) each are of constant pulse width ($t_I$) and only the interval ($t_p$) between two adjacent needle pulses (NI) is variable.

50. The apparatus of claim 49, wherein the duty cycle is from slightly above 0 to 0.3 wherein $t_I$ is the constant pulse duration and $t_p$ is the variable pulse interval.

51. The apparatus of claim 2 wherein the needle pulses (NI) are constant current pulses i.e. pulses of the same polarity.

52. The apparatus of claim 2, wherein a diode (D2) is connected antiparallel to the load (L).

53. The apparatus of claim 2, wherein the apparatus comprises an electronic rapid switch (66).

54. The apparatus of claim 2 wherein the input has an LC filter (62, 64) connected thereto.

55. The apparatus of claim 2, wherein the output has a reverse flow blocking diode (D1) connected upstream thereof.

56. The apparatus of claim 5, wherein the load is selected from the group consisting of ohmic, inductive and capacitive.

57. The apparatus of claim 2, wherein the load is an incandescent bulb.

58. The apparatus of claim 2, wherein the needle pulses (NI) have a rise time of less than 100 ns.

59. The apparatus of claim 2, wherein the needle pulses (NI) have a holding time ($t_D$) of less than 200 ns.

60. The apparatus of claim 2, wherein the needle pulses (NI) have a holding time ($t_D$) of less than 100 ns.

61. The apparatus of claim 2, wherein the needle pulses (NI) have a decay time of less than 500 ns.

62. The apparatus of claim 2, wherein the smallest period duration (T) of the needle pulses is approximately 100 ns.

63. The apparatus of claim 2, wherein the load is an electronic siren (100).

64. The apparatus of claim 2, wherein a needle pulse generator (102) controls an amplifier final stage (104) connecting a current source (108) to an electro-acoustic transducer (106) of the siren (100).

65. The apparatus of claim 1, wherein the pulse duration ($t_I$) is less than 1000 nanoseconds.

66. The apparatus of claim 1, wherein the pulse duration ($t_I$) is less than 700 nanoseconds.

67. The apparatus of claim 5, wherein the pulse duration ($t_I$) is less than 1000 nanoseconds.

68. The apparatus of claim 5, wherein the pulse duration ($t_I$) is less than 700 nanoseconds.

69. The apparatus of claim 2, wherein the pulse duration ($t_I$) is less than 1000 nanoseconds.

70. The apparatus of claim 2, wherein the pulse duration ($t_I$) is less than 700 nanoseconds.

* * * * *